July 17, 1956

J. C. ECK ET AL 2,755,134

ATOMIZING SPRAY FOR OIL GAS PRODUCTION

Filed June 29, 1955

INVENTORS
JOHN C. ECK
EDWARD M. GOCZE

BY

ATTORNEY

July 17, 1956  J. C. ECK ET AL  2,755,134
ATOMIZING SPRAY FOR OIL GAS PRODUCTION
Filed June 28, 1955  2 Sheets-Sheet 2

INVENTORS
JOHN C. ECK
EDWARD M. GOCZE
BY
ATTORNEY

United States Patent Office 2,755,134
Patented July 17, 1956

2,755,134

ATOMIZING SPRAY FOR OIL GAS PRODUCTION

John C. Eck, Convent, and Edward M. Gocze, Avenel, N. J., assignors to Allied Chemical & Dye Corporation, New York, N. Y., a corporation of New York Application June 28, 1955, Serial No. 518,552

6 Claims. (Cl. 299—115)

This invention relates to oil atomization and more particularly refers to a new and improved make-oil atomizing nozzle for oil gas production.

In oil gas production as illustrated by the methods of U. S. Patents 2,605,176–177, issued July 29, 1952, and 2,700,601–602, issued January 25, 1955, the oil atomizing spray device is an important factor both as to efficiency of oil utilization and capacity of the installation. The oil of the oil spray should be in a fine state of subdivision. The degree of subdivision should be uniform and distribution of oil should be continuous throughout the spray as a whole, i. e. there should be no oil-free spaces within the spray. Inefficient atomization of make-oil in an oil gas machine may result in overcracking and undercracking of the oil undergoing thermal decomposition when such oil is divided into large and small droplets and may further cause increased deposition of carbon on the walls of the oil gas chamber. Poor dispersion, as for example, in the form of a hollow cone of oil as compared to a continuous or solid cone of oil will materially reduce capacity of the oil gas machine.

An object of the present invention is to provide a spray nozzle adapted for use in oil gas machine which will effect dispersion of make-oil in the form of a solid cone spray.

Another object of the present invention is to provide a spray nozzle adapted for dispersing oil into a solid cone of fine droplets which is simple in construction and efficient in operation.

A still further object of this invention is to provide a spray nozzle which will mechanically convert oil into a solid cone of finely divided dispersed particles without the aid of steam or other fluid.

Other objects and advantages of the present invention will be apparent from the following description and accompanying drawings.

Referring to the accompanying drawings wherein the preferred embodiments of the invention are illustrated:

Figure 1:
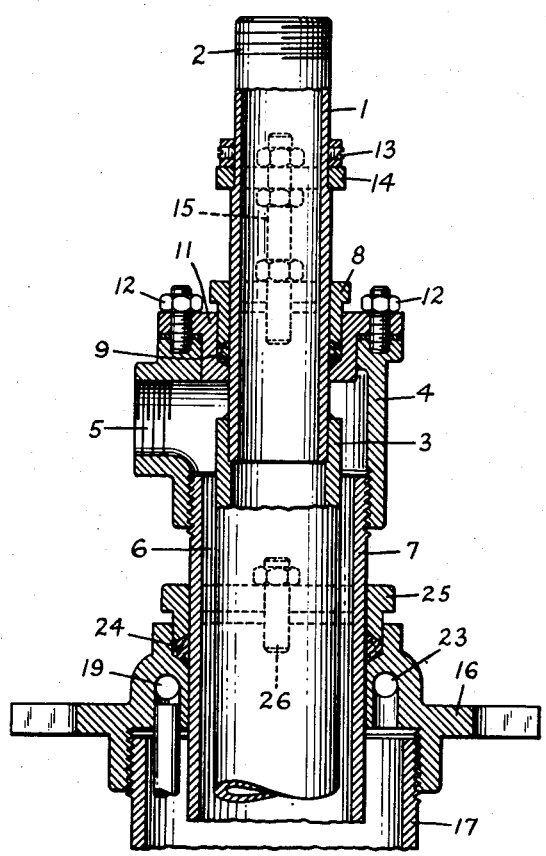
Figure 1 is a sectional view in elevation of a spray make-oil atomizing device embodied in the present invention.

Referring to Figure 1, the atomizing device comprises a tubular oil supply pipe 1 adapted to be engaged as for example by threads 2 with an outside conduit for feeding oil. Tube 1 may be of uniform diameter throughout its entire length or may be constructed of sections of different diameter as for example by welding a section of tubing 3 of larger diameter on to the smaller diameter of tubing 1. The spray device of Figure 1 employs steam to aid in the dispersion of the oil and therefore T 4 is provided with inlet 5 for the introduction of steam down through the annulus 6 formed by oil supply pipe 3 and surrounding steam casing 7 threaded to T 4. A tight joint around oil supply pipe 1 to prevent escape of steam is provided by means of packing gland 8, packing 9 and stuffing box 11 fastened to T 4 by means of bolts 12. Above packing gland 8 and surrounding pipe 1 are lock ring or set collar 13 and oil supply adjusting plate 14 resting on a shoulder of pipe 1. The packing gland 8 may be tightened by a pair of nuts on a pair of studs 15 shown in dotted lines.

The oil spray device is inserted through an opening in a chamber in an oil gas machine and fastened to the chamber by means of mounting flange 16. That portion below flange 16 extends just through the wall of the oil gas chamber but may extend further into the chamber and is subjected to high temperatures therein of the order of 1500–2400° F. To retard pyrolitic decomposition of the oil before it issues as a spray from the nozzle and to cool and protect the metal of the spray, there is provided a water jacket around steam casing 7 through which a coolant such as water circulates. Water cooling jacket 17 is engaged at its top to mounting flange 16 and closed at the bottom by spray cap 18. Water enters cooling water inlet 19 passing down through water inlet pipe 21 wherein it discharges near the bottom of water jacket 17 so as to assure the coldest water reaching a point near the bottom of the nozzle and the cooling water then flows up through annulus 22 formed by water cooling jacket 17 and steam casing 7 and out through cooling water outlet 23. A seal to prevent leakage of water is provided by packing 24, packing gland 25 and nuts on a pair of studs 26 shown in dotted lines for maintaining packing gland 25 tight. Nozzle 27 having a hexagonal base 28 is screwed up into oil supply pipe 3. Access plug 29 having a frustoconical top and an inner inverted frustoconical bottom is screwed into the top of nozzle as more fully illustrated in the sectional view of Figure 2. There is sufficient clearance between the outside wall of nozzle 27 and the inner wall of oil supply pipe 3 to permit oil to flow down through the annulus therebetween and into tangential ports 31. Oil also flows down the center of access plug 29 through a central hole 32 which may be straight or tapered. The lengthwise hole through the plug is preferably tapered so as to both decrease the velocity of the oil and to create greater interference with the rotational flow lines of oil from the tangential side holes. It was found that a tapered angle less than that created by a line drawn from the inlet end of the plug hole to the inner edge of the orifice lengthened the forward distance of travel of the dispersed oil from that produced by a straight hole, whereas the forward distance was decreased by a greater angle. A decrease in the chamber diameter decreases the plug diameter and hence decreases the plug length. The rear face of nozzle 27 designated by numeral 33 has milled cuts or channels 34 through which steam from annulus 6 enters to aid in the atomization of oil discharging from nozzle 27. The spray assembly is sealed at its bottom end by means of gasket 36 and steam plug 35 screwed to spray cap 18.

Figure 2:
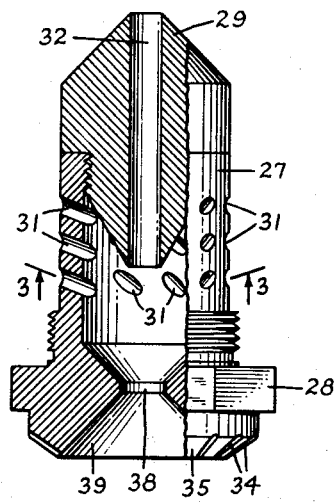
Figure 2 is an enlarged sectional view of the nozzle portion illustrated in Figure 1.

In Figure 2 may be seen in greater detail nozzle 27 into which is threaded access plug 29 having a frustoconical top and an inverted frustoconical bottom in the interior of nozzle 27. Oil simultaneously flows down through central hole 32 of plug 29 and tangential ports 31 resulting in the oil moving a rotating motion in the inner nozzle chamber 37 with its bottom portion having inverted conical shape, then discharging through cylindrical throat 38 down through dispersion cone 39 and issuing therefrom in the form of a solid cone of finely divided dispersed particles of oil. Steam passing along channels 34 of rear face 35 aids in dispersing the oil at its point of discharge. The base of nozzle 27 is shaped in the form of hexagonal nut 28 for ease in threading the nozzle in and out of oil supply pipe 3.

Figure 3:
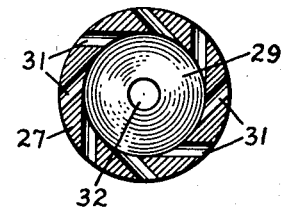
Figure 3 is a view in section taken on line 3—3 of Figure 2.

In the section of Figure 3 may be seen the walls of nozzle 27, tangential ports 31 and plug 29 having central opening 32.

Figure 4:
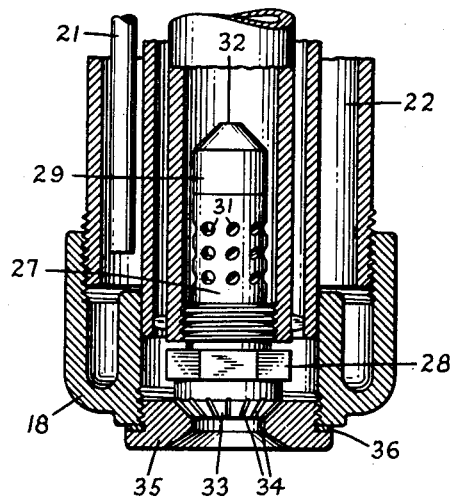
Figure 4 is a bottom view of the nozzle illustrated in Figure 2.

In bottom view of Figure 4 is seen hexagonal base 28, rear face 35, milled cuts 34, dispersion cone 39, cylindrical throat 38 and central opening 32 of plug 29.

A predominating factor in the production of oil gas is the degree of atomization of the make-oil together with the flow of the resulting oil-steam stream through the reactor space. The designs of various atomizing sprays were studied. In the course of our investigation we found it important that the inner surface of access plug 29 have a contoured surface as contrasted with the flat surface, shaped similar to the flow lines of the tangential oil streams so located that the apex of the cone shaped surface be between $\frac{3}{8}$" and $\frac{7}{8}$", preferably $\frac{5}{8}$" from the inner edge of the orifice, and that an additional straight or enlarging oil stream be added by means of a hole 32 drilled through the inner contoured access plug 29. The hole through the plug may be straight but is preferably cut at a taper so that, with straight line flow, the cross-sectional area of the circle of contact with the interior surface adjacent to the orifice is about 1.6 times the orifice area and may be between 0.45 and 3 times the orifice area. The contoured surface has the effect of decreasing the loss of oil velocity in the orifice assembly and the additional oil stream through hole 32 in plug 29 converts the oil to a solid cone dispersion of resulting atomized oil. In order to provide a separate stream of oil and at the same time dispose of the dead space in front of the plug the use of a central hole 32 in cone shaped plug 29 was adopted. It was found that the use of a cone shaped plug with no central hole increased the delivery of oil about 10% over the use of a flat plug when tested at the same pressure and that the use of cone shaped plug with a central hole increased the delivery of oil about 50% over the use of a flat plug. It was further found that the ratio of the areas of plug hole 32 to cylindrical throat 38 should be between 0.3 and 0.6, preferably 0.4–0.5 and that a plug having an apex cone angle of 30–90°, preferably 55–65°, and a base angle of about 45–75°, preferably 55–65° was satisfactory and superior to the use of cones of more acute or wider apex angles. Further consideration evolved the relationship that the ratio of the areas of tangential ports 31 to cylindrical throat 38 should be about from 1.5 to 4.0, preferably 3.25–3.50. Thus we found it most important to maintain a ratio of areas of the cylindrical throat 38 to the tangential ports 31 to the plug hole 32 in the proportion of 1:1.5–4.0:0.3–0.6, preferably 1:3.25–3.50:0.4–0.5. The cross-sectional inner area of the chamber of the nozzle should be preferably between 1.85 and 2.85 times the total area of the side holes but may be between 1.5 to 3 times this area.

Other desirable relationships in the design of the oil nozzle are (1) the tangential ports 31 should have a length at least equal to, and preferably greater than, their diameter, (2) the tangential ports 31 should be placed tangentially to, or as closely tangential to as possible without cutting into each other at the inner surface, the inner surface of the shaft of the spray, (3) the tangential ports 31 should be placed at an angle of between 5 and 20°, preferably from the cross-section line in order to best obtain the centrifugal direction imposed by the tangential cut of the side holes, (4) the tangential ports should be placed so that a line drawn in continuation of the edge of the holes (in the row of holes nearest to the orifice drilled at a 15° angle) nearest the orifice will practically intersect the apex of the cone shaped plug, and that the rows of holes be distributed uniformly almost to the cross-section line at the base of the cone, (5) the interior surface of inner nozzle chamber 37 as well as the surface in dispersion cone 39 adjacent cylindrical throat 38 should be cut at an angle of about 20–45°, preferably 25–35°, (6) the length of cylindrical throat 38 should be less than $\frac{1}{4}$", preferably about $\frac{1}{8}$" and the edges should be rounded, (7) the cross-sectional area of inner nozzle chamber 37 should be equal to, and preferably greater than the total area of tangential ports 31, (8) the total area of tangential ports 31 should be less than the cross-sectional area of the annular space between the outside surface of the shaft of nozzle 27 and the inside surface of oil supply pipe 3 into which the nozzle is screwed.

The preferred interior angle adjacent to the inner edge of the orifice may be calculated by subtracting 100 times the ratio of the orifice area to the chamber area from 45. A calculated angle of the interior surface adjacent to the inner edge of the orifice is preferred since the smaller the chamber area with respect to the various hole areas, the less the transient time for the oil and hence the greater should be the influence of this converging angle for creating the resulting dispersion.

The sizes of the various holes will of course depend on spacing desired. A convenient method of calculating the sizes of the holes for a new nozzle would be to multiply the desired gallonage per minute by 0.003 to obtain the area in square inches of cylindrical throat 38. The total area of the tangential ports 31 would be obtained by multiplying the area of cylindrical throat 38 by 3½. The area of each tangential port may be obtained by dividing the total area of the tangential ports by the number of holes of ¼" or less diameter which can be uniformly placed in the space available. The area of plug hole 32 may be obtained by multiplying the area of centrifugal throat 38 by 0.45. Merely as illustrative a make-oil nozzle for the delivery of 65 gallons oil per minute at 125 p. s. i. g. and 285° F. would have a cylindrical throat 38 diameter of 0.497", 24 tangential ports 31, each having a diameter of 0.188", and a plug hole 32 having a diameter of 0.334". This same nozzle can be converted to nozzles delivering up to 112 gallons oil per minute by increasing the sizes of all of the holes and cutting the interior surface in chamber 37 back in order to again obtain a $\frac{1}{8}$" length orifice 38. For a delivery of 112 gallons per minute at 125 p. s. i. g. the cylindrical throat 38 diameter would be 0.654", the 24 tangential ports 31 would have a diameter of 0.250" each and the plug hole 32 would have a diameter 0.438.

Novel items involved in the developed design include (a) the use of a conical shaped plug, (b) the use of a straight or tapered hole in the plug, (c) the specific distance from the apex of the conical end of the plug to the cross-section line through the inner edge of the orifice, (d) the ratios of the areas involved, (e) the location of the side holes and (f) the angle of the interior surface adjacent to the orifice.

The nozzles may be fabricated from the stainless steel which has a composition of 0.35% carbon (max.), 1.50% manganese (max.), 23.0–27.0% silicon (max.), 0.04% phosphorus (max.), 0.03% sulfur (max.), 23.0–27.0% chromium and 0.25% nitrogen (max.). This stainless steel has a tensile strength of 20,000 p. s. i. at 1300° F., a creep strength of 1% elongation in 10,000 hours of 1,700 p. s. i. at 1300° F., a Rockwell hardness of B80–84 and a Brinell hardness of 150–160.

A typical spray device for atomizing make-oil in an oil gas machine would have the following approximate dimensions: Oil supply pipe 1, 2" in inside diameter and 10" long. The wider section of oil supply pipe 3 is 2½" in inside diameter and 2 feet long. The overall length of the oil pipe is 2½⁰⁄₁₀" long. Steam inlet 5 has an opening of 1½" iron pipe size. Steam casing 7 has an outside diameter of 3½" and is 2½" iron pipe size. Water cooling jacket 17 is 6" iron pipe size and 19½" in length. The distance from mounting flange 16 to the end of the nozzle is 20½". Plug 29 and the walls of nozzle 18 have a diameter about ½ of an inch less than the inside diameter of oil supply pipe 3 leaving a clearance between the outer wall of nozzle 27 and the inside wall of nozzle supply 3 of ¼". The length of nozzle 27 is 3¼". Plug 29 when screwed in increases the height of nozzle 27 by another inch and a quarter. The overall height of the spray tubes from the bottom of steam plug 35 to the very top of oil supply pipe 1 is about 3 feet.

Figure 5:
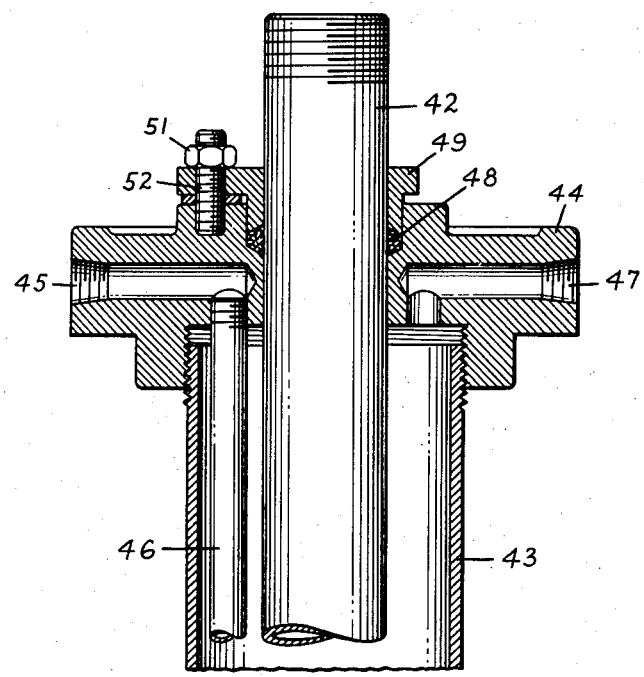
Figure 5 is a vertical section through a modified form of make-oil atomizing device.
Figure 6:
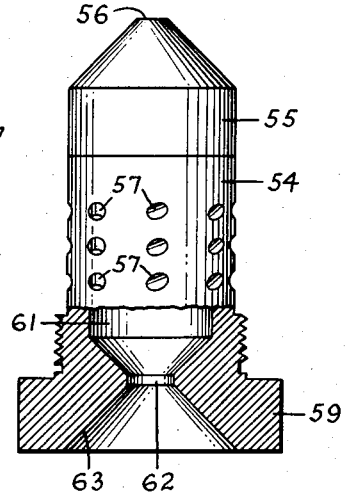
Figure 6 is an enlarged view in partial section of the nozzle illustrated in Figure 5.
Figure 7:
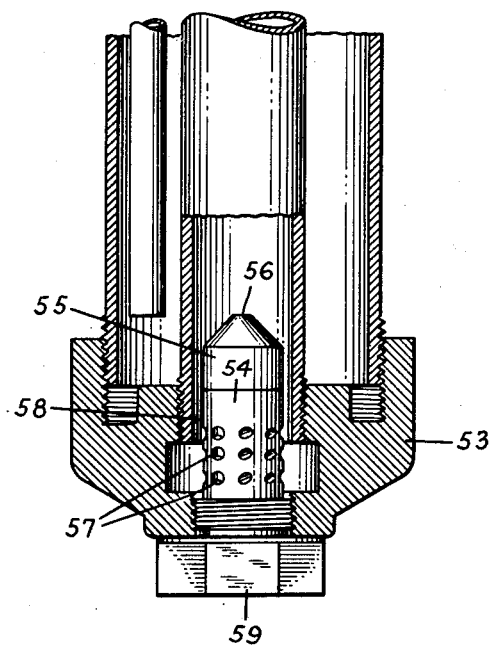
Figure 7 is a bottom view of the nozzle illustrated in Figure 6.
Figure 7:
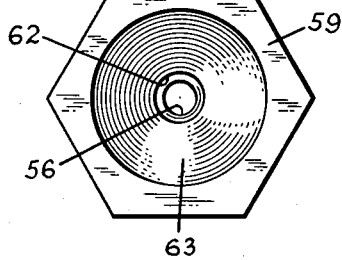

Figure 5 is another embodiment of the invention wherein make-oil is mechanically sprayed in the form of a solid cone of finely divided droplets without the aid of steam. Referring to the drawing oil supply pipe 42 adapted to be threaded to an external source of make-oil extends down into the reaction chamber of an oil gas machine. Surrounding oil supply pipe 3 is a water cooling jacket 43 screwed into mounting flange 44 which is provided with cooling water inlet 45 through which cooling water enters flowing down water inlet pipe 46 around oil supply pipe 42 and out through cooling water outlet 47. A water-tight seal is obtained by means of packing 48, packing gland 49, which latter is tightened by nut 51 on stud 52. The bottom of water jacket 43 is closed by spray cap 43. Into the botom of oil supply pipe 42 is screwed nozzle 54 which is similar in construction to nozzle 27 except that the rear face of the nozzle is not milled to provide channels for steam dispersion. At the top of nozzle 54 is plug 55, the same as plug 29 shown in Figure 2, and provided with a central hole 56 and tangential ports 57. The bottom part of nozzle is in section to show inner nozzle chamber 61 having an inverted conical contour adjacent cylindrical throat 62 and dispersion cone 63 beneath throat 62. In the bottom view of Figure 7 may be seen hexagonal base 59, dispersion cone 63, cylindrical throat 62 and access plug central hole 56.

Although certain preferred embodiments of the invention have been disclosed for purpose of illustration it will be evident that various changes and modifications may be made therein without departing from the scope and spirit of the invention.

We claim:
1. An oil atomizing spray device adapted for use in oil gas production comprising in combination an elongated tubular oil supply conduit adapted to be engaged at one end with an outside supply of feed oil, a cooling jacket surrounding at least the end portion of the oil supply conduit, an inlet for the introduction of fluid coolant into the cooling jacket and an outlet for the discharge of coolant after passage around the oil supply conduit, a spray nozzle extending into the oil supply conduit at its discharge end with sufficient clearance between the external wall of the nozzle and the internal wall of the oil supply conduit to form an annulus down through which oil may freely flow, an access plug in the inlet end of said nozzle having an inverted frustoconical shape on the discharge end of the plug with an apex cone angle of 30–90° which provides a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said inner nozzle chamber having an inverted conically shaped portion, a cylindrical throat disposed therebelow, and the areas of the cylindrical throat to the tangential side ports to the central plug hole having ratios in a proportion of about 1:1.5–4.0:0.3–0.6.

2. An oil atomizing spray device adapted for use in oil gas production comprising in combination an elongated tubular oil supply conduit adapted to be engaged at one end with an outside supply of feed oil, a spray nozzle extending into the oil supply conduit at its discharge end with sufficient clearance between the external wall of the nozzle and the internal wall of the supply conduit to form an annulus through which oil may freely flow, an access plug in the inlet end of said nozzle having an inverted frustoconical shape on the discharge end of the plug with an apex cone angle of 30–90° which provides a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said inner nozzle chamber having an inverted conically shaped portion, a cylindrical throat disposed therebelow, a conical dispersion cone beneath the cylindrical throat, and a nozzle rear face having channels for the passage of steam to aid in atomizing the oil discharging from the nozzle, said nozzle having ratios of areas of the cylindrical throat to the tangential side ports to the central plug hole in the proportion of 1:1.5–4.0:0.3–0.6, a steam casing surrounding and extending down near the end of the oil supply conduit, an inlet for the introduction of steam and passage of said steam through the annulus between the walls of the oil supply pipe and the steam casing and discharging through the channels in the rear face of the nozzle, a steam plug adjacent to said rear face of the nozzle, a cooling jacket surrounding at least the end portion of the steam casing, an inlet for the introduction of fluid coolant into the cooling jacket and an outlet for the discharge of coolant after passage around the steam casing.

3. An oil atomizing spray device adapted for use in oil gas production comprising in combination an elongated tubular oil supply conduit adapted to be engaged at one end with an outside supply of feed oil, a cooling jacket surrounding at least the end portion of the oil supply conduit, an inlet for the introduction of fluid coolant into the cooling jacket and an outlet for the discharge of coolant after passage around the oil supply conduit, a spray nozzle extending into the oil supply conduit at its discharge end with sufficient clearance between the external wall of the nozzle and the internal wall of the oil supply conduit to form an annulus through which oil may freely flow, an access plug in the inlet end of said nozzle having a frustoconical inlet end and an inverted frustoconical discharge end having an apex cone angle of 55–65° which provides a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said tangential ports being placed at an angle of about 5–20° from the cross section line and having a length at least equal to their diameter, said inner nozzle chamber having an inverted conically shaped portion, an adjacent cylindrical throat, a conical dispersion cone adjacent to the cylindrical throat, said inverted conically shaped portion having an angle of 20–45°, said cylindrical throat having rounded edges and a length of less than ¼", said inner nozzle chamber having a cross-sectional area between 1.5 and 3.0 times the total area of the spaced tangential ports, said tangential ports having a total area less than the cross-sectional area of the annular space between the outside surface of the shaft of the nozzle and the inside surface of the oil supply pipe into which the nozzle extends, and the areas of the cylindrical throat to the tangential side ports to the central plug hole having ratios in a proportion of about 1:3.25–3.50:0.4–0.5.

4. An oil atomizing spray device adapted for use in oil gas production comprising in combination an elongated tubular oil supply conduit adapted to be engaged at one end with an outside supply of feed oil, a spray nozzle extending into the oil supply conduit at its discharge end with sufficient clearance between the external wall of the nozzle and the internal wall of the supply conduit to form an annulus through which oil may freely flow, an access plug in the top of said nozzle having a frustoconical inlet end and an inverted frustoconical discharge end having an apex cone angle of 55–65° which provides a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said tangential ports being placed at an angle of about 5–20° from the cross section line and having a length at least equal to their diameter, said inner nozzle chamber having an inverted conically shaped portion, an adjacent cylindrical throat, a conical dispersion cone adjacent to the cylindrical throat, said inverted conically shaped portion having an angle of 20–45°, said cylindrical throat having rounded edges and a length of less than ¼", said inner nozzle chamber having a cross-sectional area between 1.5 and 3.0 times the total area of the spaced tangential ports, said tangential ports having a total area less than the cross-sectional area of the annular space between the outside surface of the shaft of the nozzle and the inside surface of the oil supply pipe into which the nozzle extends, and a nozzle rear face having channels for the passage of steam to aid in atomizing the oil discharging from the nozzle, said nozzle having ratios of areas of the cylindrical throat to the tangential side ports to the central plug hole in the proportion of 1:3.25–3.50:0.4–0.5, a steam casing surrounding and extending down near the end of the oil supply conduit, an inlet for the introduction of steam and passage of said steam through the annulus between the walls of the oil supply pipe and the steam casing and discharging through the channels in the rear face of the nozzle, a steam plug adjacent to said rear face of the nozzle, a cooling jacket surrounding at least the end portion of the steam casing, an inlet for the introduction of fluid coolant into the cooling jacket and an outlet for the discharge of coolant after passage around the steam casing.

5. An oil atomizing spray device adapted for use in oil gas production comprising in combination an elongated tubular oil supply conduit adapted to be engaged at one end with an outside supply of feed oil, a cooling jacket surrounding at least the end portion of the oil supply conduit, and spaced therefrom to provide an annulus through which fluid coolant may flow, a mounting flange with stuffing box sealing one end of the coolant jacket, a spray cap sealing the other end of the cooling jacket, a passageway through the mounting flange for the introduction of fluid coolant, a coolant tube in said annulus connected to said passageway for conducting the coolant to a point near the discharge end of the oil supply conduit, another passageway in said mounting flange for the discharge of coolant from the cooling jacket, a spray nozzle screwed into the spray cap and extending up into the oil supply conduit at its discharge end with sufficient clearance between the external wall of the nozzle and the internal wall of the oil supply conduit to form an annulus through which oil may freely flow, an access plug having a frustoconical inlet end and an inverted frustoconical discharge end having an apex cone angle of 55–65° screwed into and extending into the nozzle thereby providing a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said tangential ports being placed at an angle of about 15° from the cross section line and having a length at least equal to their diameter, said inner nozzle chamber having an inverted conically shaped portion, an adjacent cylindrical throat, a conical dispersion cone adjacent to the cylindrical throat, said inverted conically shaped portion having an angle of about 25–35°, said cylindrical throat having rounded edges and a length of about ⅛", said inner nozzle chamber having a cross-sectional area at least equal to the total area of spaced tangential ports, said tangential ports having a total area less than the cross-sectional area of the annular space between the outside surface of the shaft of the nozzle and the inside surface of the oil supply pipe into which the nozzle extends, and the areas of the cylindrical throat to the tangential side ports to the central plug hole having ratios in a proportion of about 1:3.25–3.50:0.4–0.5.

6. An oil atomizing spray device adapted for use in oil gas production comprising in combination an elongated tubular oil supply conduit adapted to be engaged at one end with an outside supply of feed oil, a spray nozzle screwed into and extending into the oil supply conduit at its discharge end with sufficient clearance between the external wall of the nozzle and the internal wall of the supply conduit to form an annulus through which oil may freely flow, an access plug in the inlet end of said nozzle having a frustoconical inlet end and an inverted frustoconical discharge end having an apex cone angle of 55–65° which provides a contoured surface in an inner nozzle chamber, a central hole in the access plug through which oil flows into the inner nozzle chamber, a plurality of spaced tangential ports in the side of said nozzle through which oil from the surrounding annulus flows into the inner nozzle chamber, said tangential ports being placed at an angle of about 15° from the cross section line and having a length at least equal to their diameter, said inner nozzle chamber having an inverted conically shaped portion, an adjacent cylindrical throat, a conical dispersion cone adjacent to the cylindrical throat, said inverted conically shaped bottom portion having an angle of about 25–35°, said cylindrical throat having rounded edges and a length of about ⅛", said inner nozzle chamber having a cross-sectional area at least equal to the total area of spaced tangential ports, said tangential ports having a total area less than the cross-sectional area of the annular space between the outside surface of the shaft of the nozzle and the inside surface of the oil supply pipe into which the nozzle extends, and a nozzle rear face having channels for the passage of steam to aid in atomizing the oil discharging from the nozzle, said nozzle having ratios of areas of the cylindrical throat to the tangential side ports to the central plug hole in the proportion of 1:3.25–3.50:0.4–0.5, a steam casing surrounding and extending near the discharge end of the oil supply conduit, a T and stuffing box sealing one end of the steam casing, a steam inlet in the T for the introduction of steam through an annulus between the external surface of the oil supply conduit and the internal surface of the steam casing, a cooling jacket surrounding the end of the steam casing, and spaced therefrom to provide an annulus through which fluid coolant may flow, a mounting flange with stuffing box sealing the one end of the cooling jacket, a spray cap sealing the other end of the cooling jacket, a passageway through the mounting flange for the introduction of fluid coolant, a coolant tube in said annulus connected to said passageway for conducting the coolant to a point near the discharge end of the oil supply conduit, another passageway in said mounting flange for the discharge of coolant from the cooling jacket, and a steam plug screwed into the spray cap adjacent the rear face of the nozzle having channels for the passage of steam to aid in the dispersion of oil discharging from the nozzle.

References Cited in the file of this patent

UNITED STATES PATENTS

| | | |
|---|---|---|
| 1,192,573 | Schneider | July 25, 1916 |
| 1,414,438 | Smith et al. | May 2, 1922 |
| 2,605,176 | Pearson | July 29, 1952 |
| 2,605,177 | Pearson | July 29, 1952 |
| 2,700,601 | Voelker | Jan. 25, 1955 |
| 2,700,602 | Voelker | Jan. 25, 1955 |

FOREIGN PATENTS

| | | |
|---|---|---|
| 839,528 | France | Jan. 4, 1939 |
| 1,063,462 | France | Dec. 16, 1953 |